United States Patent [19]

Haddock et al.

[11] Patent Number: 6,023,471
[45] Date of Patent: Feb. 8, 2000

[54] NETWORK INTERCONNECT DEVICE AND PROTOCOL FOR COMMUNICATING DATA AMONG PACKET FORWARDING DEVICES

[75] Inventors: Stephen R. Haddock, Los Gatos; Herb Schneider, San Jose; Curt Berg, Los Altos; Daniel J. Cimino, Oak Park; Siddharth Khattar, Goleta; Matthew T. Knudstrup, Oak Park; Mark Thomas Lytwyn, Redondo Beach; Aaron C. Tyler, Thousand Oaks; Michael Yip, Sunnyvale, all of Calif.

[73] Assignee: Extreme Networks, Santa Clara, Calif.

[21] Appl. No.: 09/032,306

[22] Filed: Feb. 27, 1998

Related U.S. Application Data

[60] Provisional application No. 60/061,317, Oct. 7, 1997.

[51] Int. Cl.$^7$ .................................................. H04L 12/56
[52] U.S. Cl. ............................................ 370/426; 370/462
[58] Field of Search ...................................... 370/355, 357, 370/360, 386, 387, 388, 389, 400, 401, 402, 403, 404, 405, 410, 447, 455, 461, 462, 384, 441, 422, 423, 426

[56] References Cited

U.S. PATENT DOCUMENTS

| | | | |
|---|---|---|---|
| 5,042,032 | 8/1991 | Dighe et al. | 370/231 |
| 5,179,550 | 1/1993 | Simpson | 370/330 |
| 5,216,668 | 6/1993 | Zhang | 370/411 |
| 5,355,364 | 10/1994 | Abali | 370/392 |
| 5,390,173 | 2/1995 | Spinney et al. | 370/60 |

(List continued on next page.)

OTHER PUBLICATIONS

International Search Report, PCT/US98/19977, 4 pages.
International Search Report, PCT/US98/17975, 4 pages.
Y. Tamir & Hsin–Chou Chi "Symmetric Crossbar Arbiters For VLSI Communication Switches", IEEE Transactions on Parallel and Distributed Systems, vol. 4, No. 1, 1993 pp. 13–27.

R. O. LaMaire & D. N. Serpanos, "Two–Dimensional Round–Robin Schedulers For Packet Switches With Mulitple Input Queues", IEEE/ ACM Transactions On Networking, vol. 2, No. 5, Oct. 1997.

(List continued on next page.)

*Primary Examiner*—Chi H. Pham
*Assistant Examiner*—Kwang B. Yao
*Attorney, Agent, or Firm*—Blakely, Sokoloff, Taylor & Zafman LLP

[57] ABSTRACT

A network interconnect device and message exchange protocol for forwarding data among packet forwarding devices are provided. According to one aspect of the present invention, data is forwarded between a first and second packet forwarding device coupled to an interconnect device. The interconnect device receives a menu message from the first packet forwarding device that indicates one or more types of data that are awaiting transmission on the first packet forwarding device. Based upon the menu message, the interconnect device transmits an order message selecting a type of data of the one or more types of data awaiting transmission to the first packet forwarding device. The interconnect device receives a message from the first packet forwarding device containing data of the type selected by the order message. The interconnect device then forwards the data to the second packet forwarding device. According to another aspect of the present invention, data is forwarded among multiple packet forwarding devices through an interconnect device by selecting a configuration of the interconnect device based upon ports to which the packet forwarding devices have data to transfer. For each of the ports of the interconnect device, an indication of ports to which an attached packet forwarding device has data to transfer is received. Based upon these port indications, a configuration of the interconnect device is selected that contains non-conflicting paths through the interconnect device. Data is then forwarded in accordance with the selected configuration by forwarding data from those of the of packet forwarding devices coupled to ports that have been selected as source ports to corresponding destination ports.

32 Claims, 12 Drawing Sheets

U.S. PATENT DOCUMENTS

| | | | |
|---|---|---|---|
| 5,402,416 | 3/1995 | Cieslak et al. | 370/60 |
| 5,453,979 | 9/1995 | Schibler et al. | 370/395 |
| 5,463,486 | 10/1995 | Stevens | 359/117 |
| 5,491,694 | 2/1996 | Oliver et al. | 370/455 |
| 5,500,858 | 3/1996 | McKeown | 370/60 |
| 5,633,867 | 5/1997 | Ben-Nun et al. | 370/399 |
| 5,689,644 | 11/1997 | Chou et al. | 370/392 |
| 5,710,893 | 1/1998 | Lindgren | 395/311 |
| 5,742,604 | 4/1998 | Edsall et al. | 370/401 |
| 5,790,546 | 8/1998 | Dobbins et al. | 370/400 |
| 5,825,772 | 10/1998 | Dobbins et al. | 370/396 |

OTHER PUBLICATIONS

L.C. Lund, N. Reingold, "Fair Prioritized Scheduling In An Input–Buffered Switch", IEEE Conf. on Broadband Communications '96 Montreal, Apr. 1996, pp. 359–368.

J. Y. Hui & E. Arthurs, "A Broadband Packet Switch For Integrated Transport", IEEE Journal On Selected Areas In Communication, vol. SAC–5, Oct. 1987, pp. 1264–1272.

C. Patridge, P.P. Carvey, E. Burgess, I. Castineyra, T. Clarke, L. Graham, M. Hathaway, P. Herman, Allen King, S. Kohalmi, T. Ma, J. Mcallen, T. Mendez, W. C. Milliken, R. Pettyjohn, J. Rokosz, J. Seeger, M. Sollins, S. Storch, B. Tober, G. D. Troxel, D. Waitzman & S. Winterble, "A 50–Gb/s IP Router", IEEE/ ACM Transactions On Networking, vol. 6, No. 3, Jun. 1998, pp. 237–248.

A. Demers, S. Keshav & Scott Shenker, "Analysis And Simulation Of A Fair Queueing Algorithm", Internetworking: Research and Experience, vol. 1 1990, pp. 3–26.

T. E. Anderson, S. S. Owicki, J. B. Saxe & C. P. Thacker, "High–Speed Switch Scheduling For Local–Area Networks", ACM Transactions On Computer Systems, vol. 11, No. 4, Nov. 1993, pp. 319–352.

M. M. Ali & H. Tri Nguyen, "A Neural Network Implementation Of An Input Access Scheme In a High–Speed Packet Switch", IEEE Global Telecommunications Conference & Exhibition, Nov. 1989, pp. 1192–1196.

Nick McKeown, "Fast Switched Backplane For A Gigabit Switched Router", Department of Electrical Engineering, Stanford University, pp. 1–30.

NETWORK INTERCONNECT DEVICE AND PROTOCOL FOR COMMUNICATING DATA AMONG PACKET FORWARDING DEVICES

This application claims the benefit of U.S. Provisional Application No. 60/061,317, filed Oct. 7, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a network interconnect device and a protocol for communicating data among packet forwarding devices.

2. Description of the Related Art

Local Area Network (LAN) switches are typically employed to solve congestion problems associated with LANs that arise as workgroups and networks, such as an Ethernet, grow. (The terms Ethernet LAN, or simply Ethernet, Fast Ethernet LAN, or simply Fast Ethernet, Gigabit Ethernet LAN, or simply Gigabit Ethernet, as used herein shall apply to LANs employing Carrier Sense, Multiple Access with Collision Detection (CSMA/CD) as the medium access method, generally operating at a signaling rate of 10 Mb/s, 100 Mb/s, and 1,000 Mb/s, respectively over various media types and transmitting Ethernet formatted or Institute of Electrical and Electronic Engineers (IEEE) standard 802.3 workgroups into different LANs having separate collision domains and switching traffic, i.e., data packets, between the workgroups at very high speeds.

Switches are generally offered as part of either a pure stackable or pure chassis-based product line thereby forcing network managers to choose between stackable or chassis switching. There are advantages to both approaches. For instance, stackable switches offer flexibility and low entry-cost, while chassis-based switches offer fault tolerance and high port-density.

What is needed is a combination of stackable and chassis switching technology, which will provide network managers an incremental way to build faster, more manageable networks. Additionally, as intranet requirements grow throughout an enterprise, it is desirable to have available a cost-effective migration path that allows the port density, fault tolerance and performance of LAN switches to scale dramatically. More particularly what is needed are packet forwarding devices, e.g. switches, and network interconnect devices (which may serve individually or coupled in parallel as an external backplane, for example) that are designed to bring together the flexibility and low entry-cost of a stackable system and the fault tolerance and high port-density of a chassis-based system. Further, it would be advantageous to provide mechanisms, such as path arbitration and handshaking, to reduce the need for packet buffering and to simplify packet forwarding logic within the network interconnect device, thereby allowing such a network interconnect device to be manufactured at a reasonable cost.

BRIEF SUMMARY OF THE INVENTION

A network interconnect device and message exchange protocol for forwarding data among packet forwarding devices are described. According to one aspect of the present invention, data is forwarded between a first and second packet forwarding device coupled to an interconnect device. The interconnect device receives a menu message from the first packet forwarding device that indicates one or more types of data that are awaiting transmission by the first packet forwarding device. Based upon the menu message, the interconnect device transmits an order message to the first packet forwarding device selecting a type of data of the one or more types of data awaiting transmission. The interconnect device receives a message from the first packet forwarding device containing data of the type selected by the order message. The interconnect device then forwards the data to the second packet forwarding device.

According to another aspect of the present invention, data is forwarded among multiple packet forwarding devices through an interconnect device by selecting a configuration of the interconnect device based upon ports to which the packet forwarding devices have data to transmit. For each of the ports of the interconnect device, an indication of ports for which an attached packet forwarding device has data to transmit is received. Based upon these port indications, a configuration of the interconnect device is selected that contains non-conflicting paths through the interconnect device. Data is then forwarded in accordance with the selected configuration by forwarding data from those of the of packet forwarding devices coupled to ports that have been selected as source ports to corresponding ports that have been selected as destination ports. Advantageously, in this manner, the network interconnect need not route packets in a traditional sense, but merely them from a source port to a corresponding destination port in accordance with the selected configuration. Further, buffering at the interconnect device can be minimized because the selected configuration assures no contention at the destination ports.

According to yet another aspect of the present invention, a virtual chassis backplane including M interconnect devices may be coupled to N packet forwarding devices to provide M redundant paths to/from each of the packet forwarding devices through the virtual chassis backplane. In this manner, Features normally associated with a chassis based product, such as modularity and robustness, may be achieved by coupling multiple interconnect devices in parallel.

Other features of the present invention will be apparent from the accompanying drawings and from the detailed description which follows.

DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A network interconnect device and message exchange protocol for forwarding data among packet forwarding devices are described. In the following description, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by special purpose hardware components or may be embodied in machine-executable instructions, which may be used to cause a general-purpose or special-purpose processor programmed with the instructions to perform the steps. Alternatively, the steps may be performed by a combination of hardware and software.

Exemplary Communication Networks

Figure 1A:
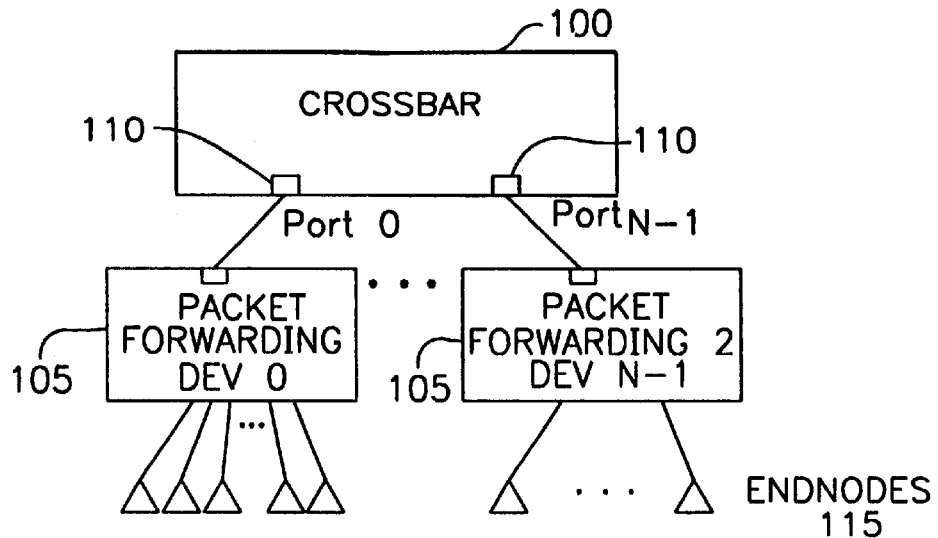
FIGS. 1A and 1B illustrate communication networks in which embodiments of the present invention may be implemented.

FIG. 1A illustrates packet forwarding devices 105 coupled in communication through a stand alone network interconnect device 100. The network interconnect device 100 is capable of forwarding data from any port 110 to any other port 110. Such a device is typically referred to as a crossbar. A plurality of packet forwarding devices 105 may be coupled to ports 110 of the interconnect device 100. As one feature of the present invention, the crossbar 100 employs a novel handshaking protocol (also referred to as the message exchange protocol) to query the packet forwarding devices 105 about the type of data they have available to transmit. According to one embodiment of the present invention, the types of data awaiting transmission at a particular packet forwarding device 105 may be characterized by the data's destination, e.g., the crossbar port 110 to which the destination endnode 115 is coupled. Of course, various other ways of characterizing types of data will be apparent to those of ordinary skill in the art. In any event, the protocol also provides a mechanism for the crossbar 100 to request a specific type of data from the available types of data awaiting transmission at a particular packet forwarding device 105. According to one embodiment, the crossbar 100 also employs a selection mechanism to determine which of the available types of data to select. The selection mechanism and the message exchange protocol are discussed further below.

Figure 1B:
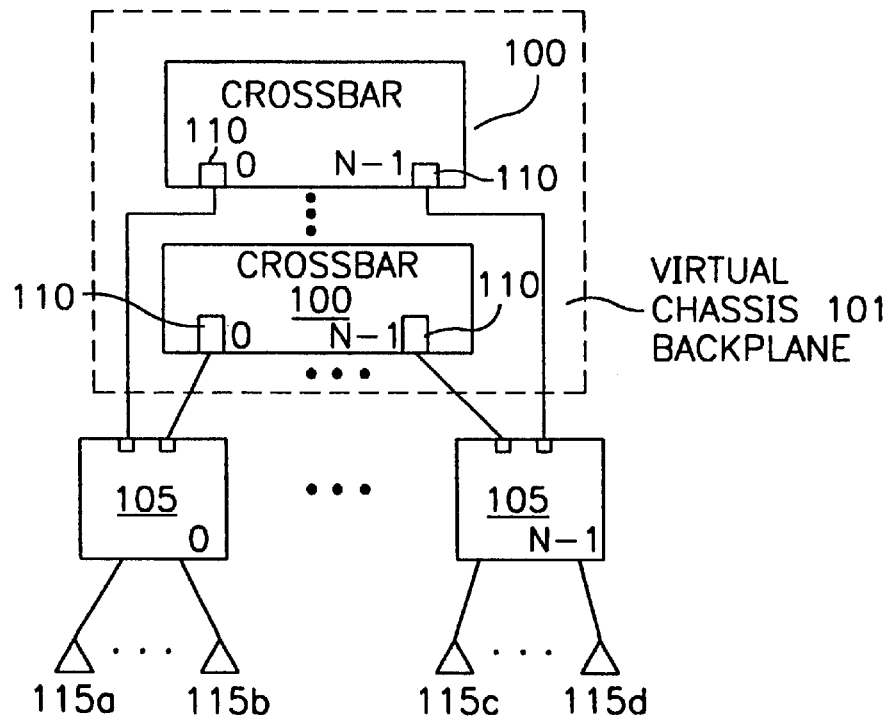

FIG. 1B illustrates another network configuration in which forwarding devices 105 may be coupled to multiple crossbars 100. In this embodiment, each of N packet forwarding devices 105 may be coupled to each of M crossbars 100. The multiple crossbars 100 collectively act as an external backplane referred to herein as a "virtual chassis backplane" 101. That is, features normally associated with the backplane of a chassis-based LAN switch, such as modularity and robustness (e.g., redundant power supplies, switch matrices, and paths to the switch matrices), may be achieved by coupling multiple stand alone crossbars 100 in parallel.

At this point it is important to note due to the message exchange protocol implemented on both the packet forwarding devices 105 and the crossbars 100, the packet forwarding devices 105 are able to recognize the multiple parallel crossbars 100 comprising the virtual chassis backplane 101 as a single logical unit. In this manner, the virtual chassis backplane 101 is transparent to the data link and network layer protocols running on the packet forwarding devices 105, such as the Spanning Tree Protocol and routing protocols because the parallel paths between the packet forwarding devices 105 are treated as a single path. For example, no duplicate paths through the virtual chassis backplane 101 are cut off or blocked by the Spanning Tree Protocol as would occur in a network configuration including parallel prior art switches, which duplicate paths would otherwise be interpreted as loops in the network topology.

Therefore, it should be appreciated in this embodiment, M parallel paths exist between endnodes 115 coupled to separate ones of the packet forwarding devices 105. Advantageously, in this manner, the modularity and robustness normally associated with a chassis-based product may be achieved by coupling multiple interconnect devices in parallel. Additionally, in this configuration, data may be simultaneously forwarded from endnode 115d to endnode 115a as data is forwarded from endnode 115b to endnode 115c, for example. Further, according to this embodiment, each additional crossbar 100 coupled in parallel to the packet forwarding devices 105 increases the available bandwidth through the virtual chassis backplane 101.

Alternatives to the stand alone interconnect device depicted in FIGS. 1A and 1B are contemplated by the inventors of the present invention. For example, in an alternative embodiment, M crossbars 100 may serve as a chassis backplane for up to an N-slot chassis in which N packet forwarding devices embodied in chassis add-in cards may be installed.

Exemplary Crossbar Architectures

The crossbar 100 is responsible for coordinating traffic between the attached packet forwarding devices 105. Briefly, this is accomplished by the exchange of "menus" and "orders" (also referred to as commands) between the packet forwarding devices 105 and the crossbars 100. Using a message exchange protocol, each of the packet forwarding devices communicates the type of data they have for the other attached packet forwarding devices. The message or "cell" that carries this information is referred to as a "menu." The crossbar 100 determines an efficient and fair allocation of its bandwidth among the attached packet forwarding devices 105 as described below and places appropriate orders with the packet forwarding devices 105. The crossbar 100 generates these "orders" based upon the menus received during a current cell interval or time slot. An order is transmitted to each attached packet forwarding device that instructs the packet forwarding device to transmit to the crossbar 100 a particular type of data identified by the order. This process is repeated for each cell interval.

Figure 2A:
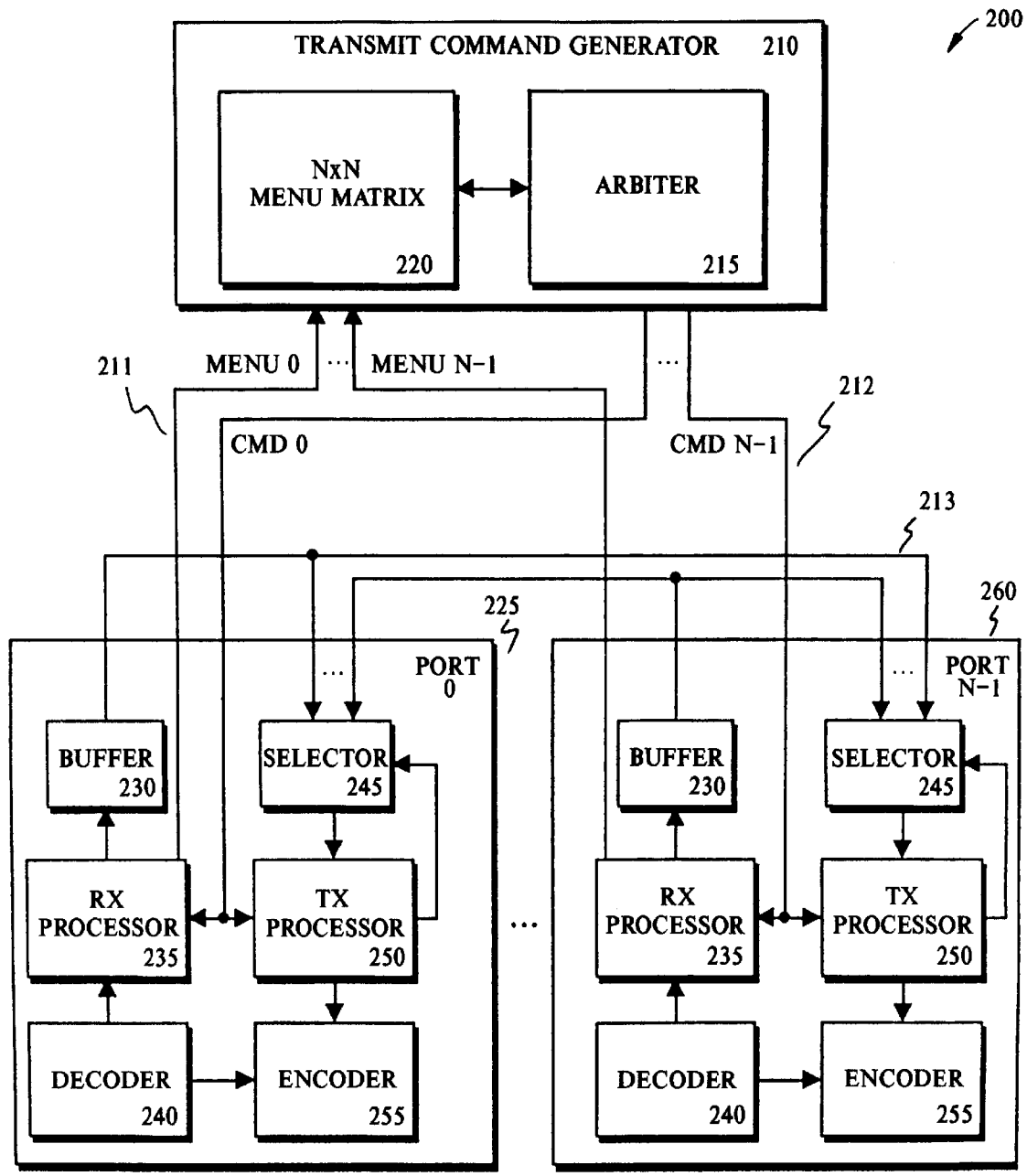
FIG. 2A is a simplified block diagram of an exemplary crossbar switch architecture according to one embodiment of the present invention.

Having briefly explained the function of the crossbar 100, a simplified block diagram of an exemplary crossbar architecture 200 will now be described with reference to FIG. 2A. According to the embodiment depicted, the crossbar 200 includes a plurality of ports (225 and 260) and a transmit command generator 210 coupled by a menu bus 211, a command bus 212, and N data buses 213.

Each port (225 and 260) further includes a decoder 240, a receive processor 235, a selector 245, a transmit processor 250, and an encoder 255. Importantly, if the lengths of the links coupling the endnodes 115 to the ports (225 and 260) vary, then preferably the ports each also include a buffer 230 to compensate for the differences in link lengths as discussed further below. For example, received data may be inserted into a FIFO buffer to temporarily store data from the shorter links until data arrives from the longer links.

The decoder 240 and encoder 255 receive and transmit data, respectively, according to an encoding scheme recognized by the packet forwarding devices 105. According to one embodiment, standard Ethernet physical layer encoding is employed. For example, the same physical encoding scheme as the Gigabit Ethernet physical sublayer may be used.

The receive processor 235 is coupled to the decoder 240, the buffer 230 and the transmit command generator 210. According to one embodiment, the receive processor 235 is responsible for processing cells received from the packet forwarding devices 105. Such processing may include checking header checksums, buffering data in the buffer 230, transferring menus to the transmit command generator 210 via the menu bus 211, transferring cell data over the appropriate data bus 213 to the transmit processor 250 associated with the destination port, and confirming that the expected data, i.e., data ordered by the transmit command generator 210, is received by maintaining a receive pipeline of expected destination ports, for example, as described further below.

The transmit command generator 210 is coupled to the receive processors and transmit processors of each port through the command bus 212. The transmit command generator 210 determines commands to issue to the attached packet forwarding devices 105 based upon the menus received from the packet forwarding devices 105. According to the embodiment depicted, the transmit command generator 210 includes an arbiter 215 and an N×N menu matrix 220. The menu matrix 220 is a representation of all possible paths through the crossbar 200 in terms of source-destination port pairings. Menus received from the packet forwarding devices 105 are written into the menu matrix 220 and the arbiter 215 selects a configuration for the crossbar 200 according to predetermined criteria described in detail below. Based upon the selected configuration, orders are generated for transmission to the packet forwarding devices 105 via the transmit processor 250.

At the appropriate cell interval, the transmit processor 250 selects data from the appropriate buffer 230 using the selector 245, attaches a header, and transmits the cell to the attached packet forwarding device through the encoder 255.

Figure 2B:
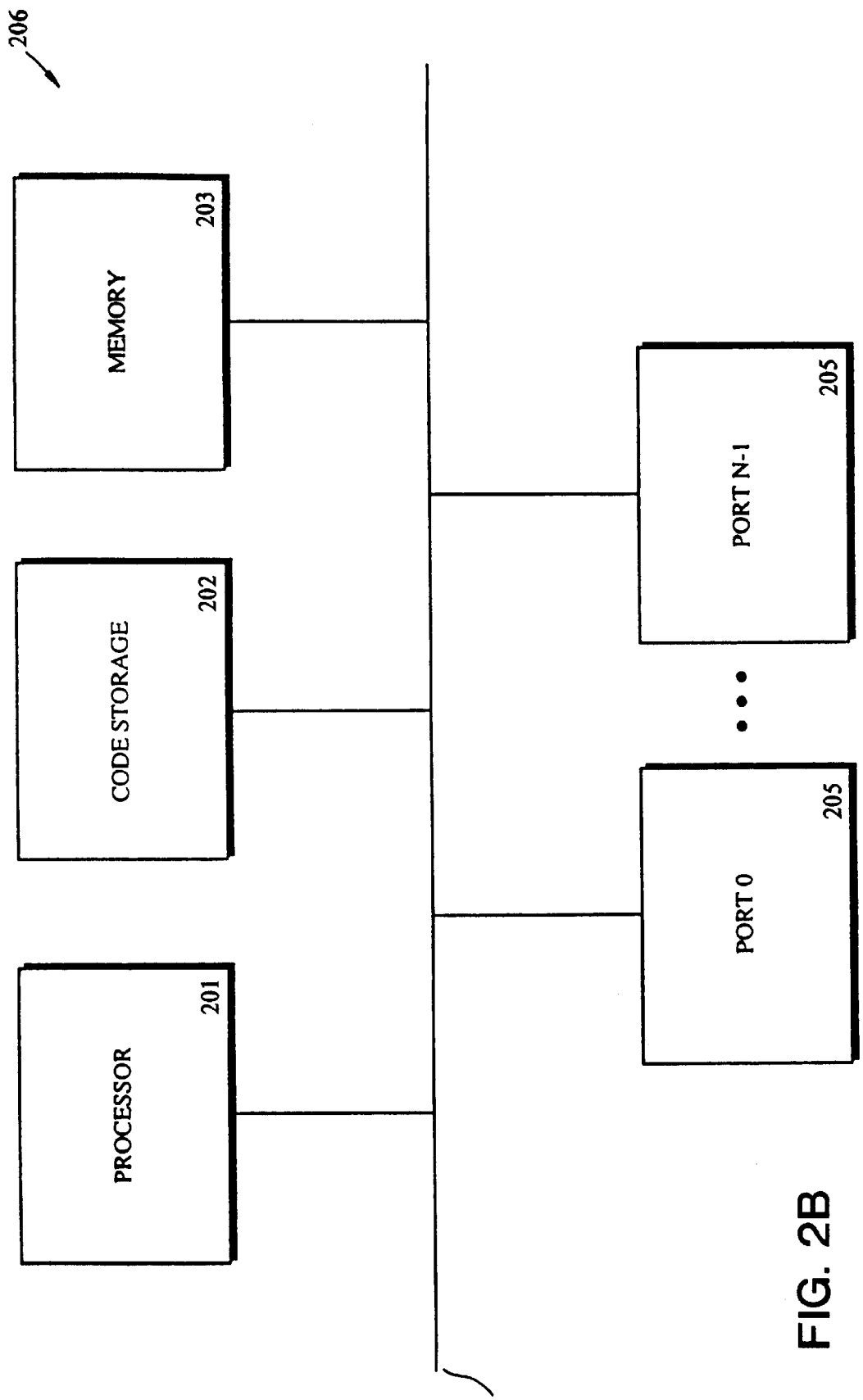
FIG. 2B is a simplified block diagram of an exemplary crossbar switch architecture according to an another embodiment of the present invention.

FIG. 2B is a simplified block diagram of a crossbar switch 206 in which an alternative embodiment of the present invention may be implemented. The crossbar switch 206 includes a processor 201, a non-volatile code storage 202, a memory 203, and a plurality of ports 205, all intercoupled by a bus 204. According to one embodiment of the present invention, the processor 201 executes program code stored in code storage 202 to implement the message exchange protocol between the crossbar 206 and the plurality of attached packet forwarding devices 105. The program code may further control selection of various path configurations through the crossbar 206 and other functions of the crossbar 206. Memory 203 is used to store the results of intermediate calculations and other program variables. In one embodiment, memory 203 includes non-volatile random access memory (RAM) to store programmable configuration information, such as a menu matrix search sequence as discussed further below.

Examples of packet forwarding devices 105 that may be coupled to the crossbar 100 include Ethernet switches such as the Summit™ 1 switch and the Summit™ 2 switch, manufactured by Extreme Networks, the assignee of the present invention. Summit™ is a trademark of Extreme Networks, Inc. of Cupertino, Calif.

Exemplary Cell Window and Cell Format

Figure 3A:
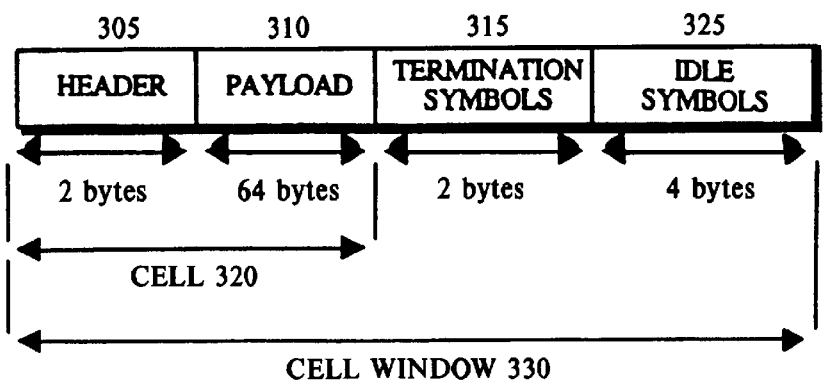
FIG. 3A illustrates a cell format and cell window according to one embodiment of the present invention.

According to one embodiment, messages referred to as "cells" may be employed to implement the message exchange protocol including the communication of menus and orders. FIG. 3A illustrates a cell and cell window format according to one embodiment of the present invention. According to this embodiment, the message exchange protocol cell window includes a cell 320, one or more termination symbols 315, and zero or more idle symbols 325. The cell 320 contains a header 305 and a payload 310.

The header 305, as described in further detail below, may be used to communicate control information between the crossbar 100 and the packet forwarding devices 105. The payload 310 follows the header 305 and includes data destined for one of the packet forwarding devices coupled to the crossbar 100. After the payload 310, one or more termination symbols 315 may be employed to indicate the end of valid data.

Alternative configurations and arrangements of the cell portions are contemplated. In other embodiments, for example, the cell fields need not follow the order depicted. Further, it is appreciated that the message exchange protocol may be implemented with more or less fields than depicted.

Figure 3B:
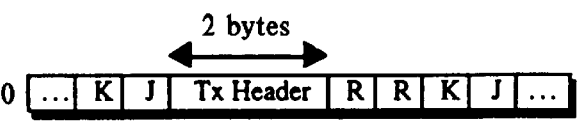
FIG. 3B illustrates a cell window containing a command cell transmitted by an interconnect device with no data present according to one embodiment of the present invention.

FIG. 3B illustrates a cell window containing a command cell 340 that may be transmitted to a packet forwarding device 105 by the crossbar 100 when no data is being forwarded to the packet forwarding device 105 according to one embodiment of the present invention. In this example, the cell 340 carries only a 2 byte transmit header. The transmit header may be requesting a "menu" from the packet forwarding device 105 or sending an "order" for a particular type of data that is awaiting transmission at the packet forwarding device 105. Orders and menus will be described further below.

Figure 3C:
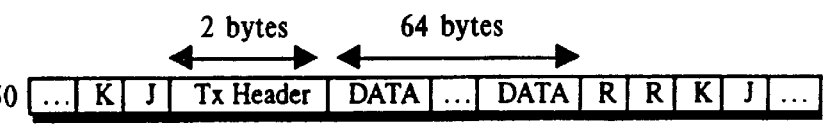
FIG. 3C illustrates a cell window containing a command cell transmitted by an interconnect device that does not contain the last byte of a packet according to one embodiment of the present invention.

FIG. 3C illustrates a cell window containing a command cell 350 that does not contain the last byte of a packet according to one embodiment of the present invention. In this example, the cell 350 being transmitted is shown carrying a 2 byte transmit header and 64 bytes of data followed by two "R" termination symbols. Before discussing this and other examples, it should be understood that two termination symbols are employed by the embodiment of the message exchange protocol discussed herein, a "T" symbol and an "R" symbol. According to this embodiment, the end of a frame (e.g., a link layer Ethernet frame) is indicated by a "T" followed by an "R" rather than two consecutive "R" symbols. Therefore, when the destination packet forwarding device 105 receives this cell 350, it expects the crossbar 100 to transmit at least one more cell to complete this packet.

Figure 3D:
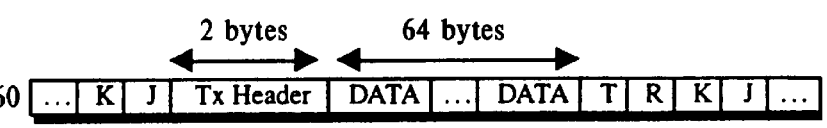
FIG. 3D illustrates a cell window containing a command cell transmitted by an interconnect device that contains the last byte of a packet according to one embodiment of the present invention.

FIG. 3D illustrates a cell window containing a command cell 360 that contains the last byte of a packet according to one embodiment of the present invention. In this example, the cell 360 is shown carrying a 2 byte transmit header and 64 bytes of data followed by a "T" termination symbol and an "R" termination symbol. As discussed above, because the "T" termination symbol follows the last data byte, this cell 360 is recognized by the destination packet forwarding device 105 as containing the last byte of packet data.

Figure 3E:
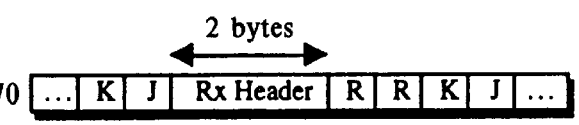
FIG. 3E illustrates a cell window containing a cell received from a packet forwarding device in response to a null command or false command according to one embodiment of the present invention.

FIG. 3E illustrates a cell window containing a cell 370 that may be received by the crossbar 100 in response to a null command or false command according to one embodiment of the present invention. In this example, the cell 370 carries only a 2 byte receive header. "Null" and "false" commands/orders will be described below. As will be discussed further below, no data is transmitted in response to null or false commands/orders.

Figure 3F:
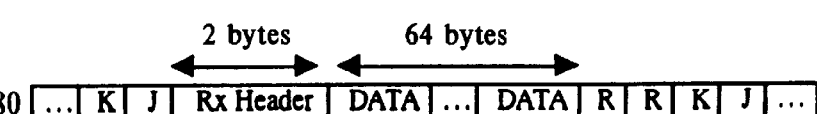
FIG. 3F illustrates a cell window containing a cell received from a packet forwarding device that does not contain the last byte of a packet according to one embodiment of the present invention.

FIG. 3F illustrates a cell window containing a cell 380 transmitted to the crossbar 100 from a packet forwarding device 105 that does not contain the last byte of a packet according to one embodiment of the present invention. In this example, the cell 380 includes a 2 byte receive header and 64 bytes of data followed by two "R" termination symbols. Therefore, the crossbar 100 will expect at least one more cell to complete the packet.

Figure 3G:
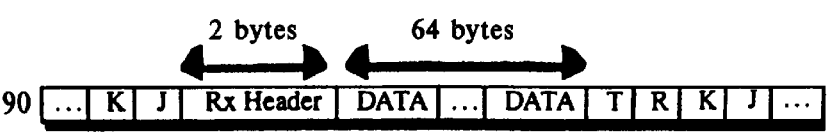
FIG. 3G illustrates a cell window containing a cell received from a packet forwarding device that contains the last byte of a packet according to one embodiment of the present invention.

FIG. 3G illustrates a cell window containing a cell 390 transmitted to the crossbar 100 from a packet forwarding device 105 that contains the last byte of a packet according to one embodiment of the present invention. In this example, the cell 390 includes a 2 byte receive header and 64 bytes of data followed by a "T" termination symbol and an "R" termination symbol. As described above, this combination of termination symbols signifies the end of a frame according to this embodiment.

Importantly, the payload 310 need not always be filled with valid data nor must the payload 310 have a fixed size. To accomodate packets of a size that are not an integer multiple of the payload size (64 bytes in the examples above), the unused portion of the payload 310 may be padded with null symbols or "R" termination symbols, for example. Alternatively, the payload size may be variable. In which case, remainder of the cell window 330 may be filled with additional "R" termination symbols or idle symbols.

Exemplary Cell Header Formats

Figure 4A:
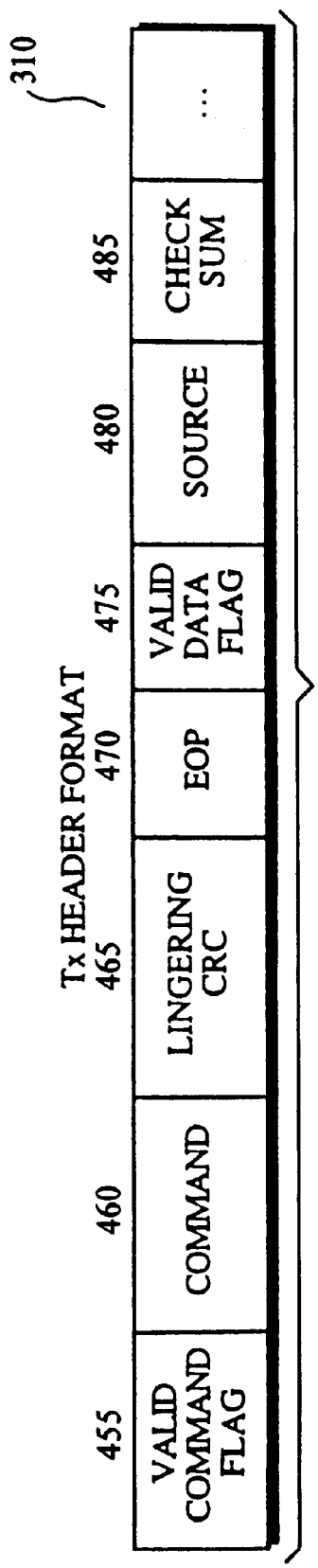
FIG. 4A illustrates a transmit cell header format originated from an interconnect device according to one embodiment of the present invention.

FIG. 4A illustrates a transmit cell header format according to one embodiment of the present invention. The transmit cell header 305, according to the embodiment depicted, includes a valid command flag field 455, a command field 460, a lingering CRC field 465, an EOP field 470, a valid data flag field 475, a source indication field 480, and a checksum field 485.

The valid command flag field 455 is set to indicate that the cell 320 contains a valid command (e.g., an "order" from the "menu" previously provided by the packet forwarding device 105).

According to this embodiment, the command field 460 is a binary encoding of the crossbar port 110 for which data is being requested. Therefore, for an 8 port crossbar, a 3-bit encoding is sufficient for the command field 460.

The lingering CRC field 465 may be used to indicate the CRC for the current packet will be contained in a subsequently received cell for this port. For example, the lingering CRC field 465 may contain a flag that is asserted when the cell being received contains the last valid data for the current packet, but the length of the data prevented the CRC from being transmitted in the current cell 320.

The EOP field 470 may include a flag that is set when the last valid data for the current packet is being received. In the case of lingering CRC, the flag is set in the cell containing the last bytes of valid data, and not in the subsequent cell containing only the CRC.

The valid data flag field 475 is set to indicate the cell 320 contains valid data in the payload 310.

The source indication field 480 is a binary encoding of the port of the crossbar 100 to which the source packet forwarding device 105 is coupled. Again, assuming the crossbar 100 has 8 ports, a 3-bit encoding is sufficient. It is appreciated that the number of bits used to encode the crossbar ports may be increased to accommodate an increased number of crossbar ports or decreased to identify less ports.

According to one embodiment, the checksum field 485 is a 4-bit checksum for detecting bit errors in the above data fields of the header 305. The checksum field 485 may be determined by XORing predetermined sets of four bits for the data fields covered, for example, or by other well known methods of checksum generation.

Figure 4B:
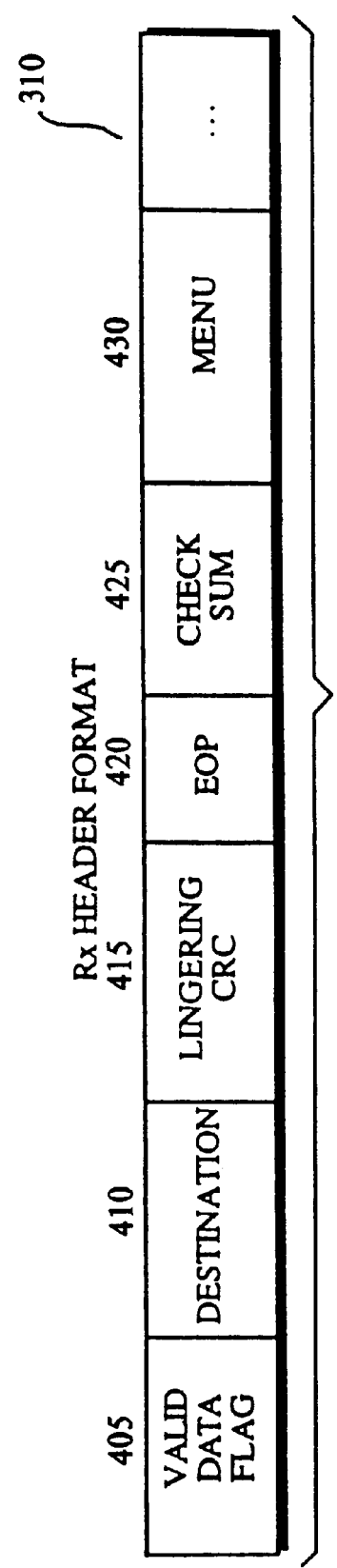
FIG. 4B illustrates a receive cell header format originated from a packet forwarding device according to one embodiment of the present invention.

FIG. 4B illustrates a receive cell header format according to one embodiment of the present invention. The receive cell header 305, according to the embodiment depicted, includes a valid data flag field 405, a destination indication field 410, a lingering CRC field 415, an end of packet (EOP) field 420, a checksum field 425, and a menu field 430.

When set, the valid data flag field 405 indicates that the cell contains valid data and is not merely a response to a null or false order, which does not include a payload 310. If the valid data flag field 405 is set, the destination indication field 410 contains a binary encoding of the destination port 110 of the crossbar 100 to which the destination packet forwarding device is coupled. If the valid data flag field 405 is not set, then the cell 320 only contains valid data in the menu field 430. That is, the destination indication field 410 should be ignored and no data is included in the payload 310 of the cell 320.

As above, the lingering CRC field 415 may comprise a flag which is asserted when the CRC for the current packet will be contained in the next cell for the indicated destination.

The EOP field 420 may comprise a flag which is set when the last valid data for the current packet is being transmitted. Again, in cases of lingering CRC, the flag is set only when the last valid data is being transmitted, and is not set when the payload 310 contains only a CRC.

According to one embodiment, the checksum field 425 is a 2-bit checksum for detecting bit errors in the header bits including the lingering CRC field 415, the EOP field 420, the destination indication field 410, and the valid data flag field 405. The checksum field 425 may be determined by XORing predetermined pairs of bits for the data fields covered, for example, or by other well known methods of checksum generation.

According to the embodiments discussed herein, the menu field 430 is an N-bit, bit-masked character. An asserted bit at a particular bit position in the menu field 430 indicates the availability of data for the corresponding one of N ports of the crossbar 100. For example, if both bits 0 and 5 of the menu field 430 are set in a menu received from a particular packet forwarding device 105, then the packet forwarding device 105 has data to send to both the packet forwarding devices attached to ports 0 and 5 of the crossbar 100. Other port encodings will be apparent to those of ordinary skill in the art. However, this particular representation is convenient for use with the N×N menu matrix 220.

Link Length Considerations

Having described exemplary cell formats for implementing a message exchange protocol some considerations with regard to the variable length of the links between the crossbar 100 and the packet forwarding devices 105 will now be discussed with reference to FIG. 5 and FIG. 2A. While each of the transmit processors 250 of the crossbar 100 are in lockstep, i.e. transmitting their headers and data fields at the exact same time, it should be appreciated in stand alone crossbar embodiments, cells transmitted by the attached packet forwarding devices 105 may be received by the crossbar 100 at different times due to varying link lengths. The crossbar 100 is configured to accommodate the worst case cell delay for the longest link.

Figure 5:
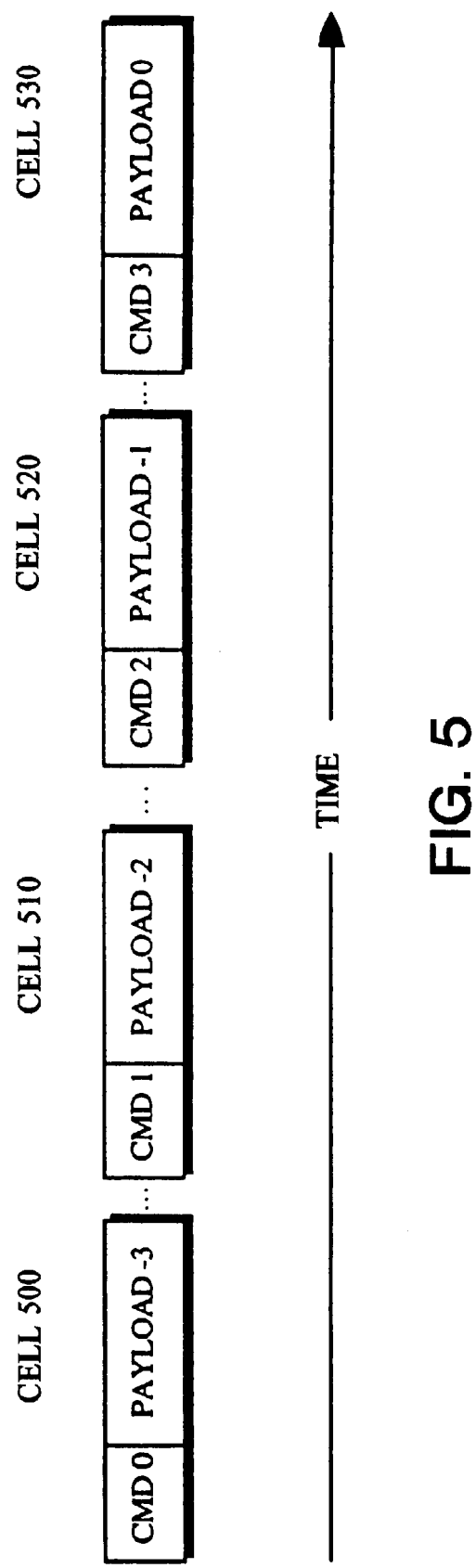
FIG. 5 is a timeline illustrating the time delay between a command requesting a particular type of data and the delivery of such data according to one embodiment of the present invention.

FIG. 5 is a time line illustrating the time delay between commands requesting particular types of data (e.g., data destined for a packet forwarding device attached to a particular port of the crossbar 100) and the actual forwarding of such data according to one embodiment of the present invention. In the embodiment depicted, the transmit command generator 210 issues CMD 0 in the header of cell 500 requesting data that it expects to transmit 3 cell intervals later in cell 530. Meanwhile, cell 500 carries payload minus 3 corresponding to data requested 3 cell intervals prior. Similarly, both cells 510 and 520 request data for 3 intervals later while transmitting payloads from previous requests.

A further concern in stand alone embodiments is erred or lost cells as a result of broken links, links that are longer than the maximum length, and other causes. Therefore, according to one embodiment, an "expected cell" pipeline is maintained at each receive processor to confirm cells received by the port match one of the cells "expected" by the port. A further check may be performed by including an "expected cell" pipeline at each transmit processor and associating tag information, including the destination port, with cell data in the FIFO buffers. In this manner, the transmit processor 250 may verify it will forward the correct data prior to actually forwarding the cell.

Link Configuration

Figure 6:
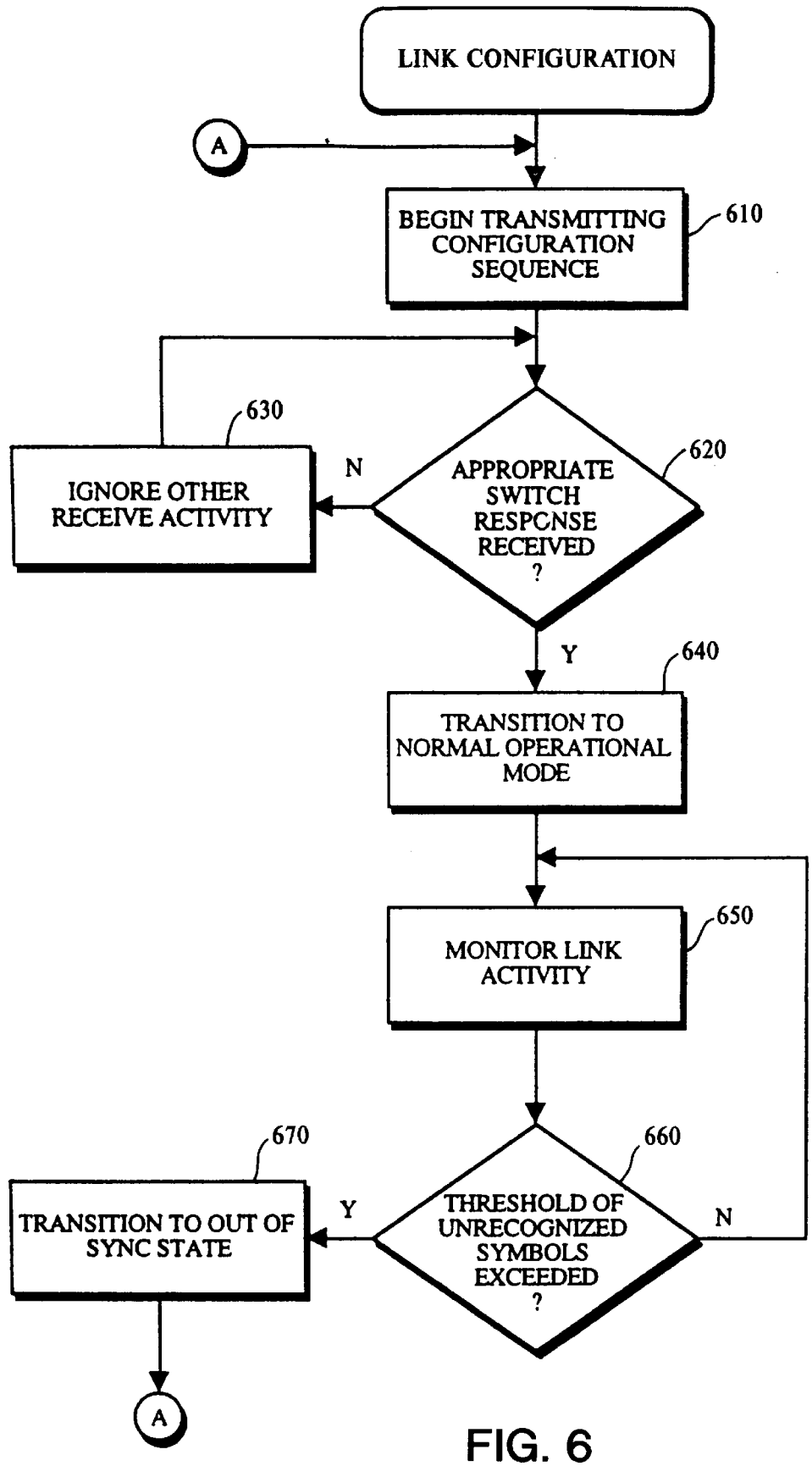
FIG. 6 is a flow diagram illustrating link configuration processing according to one embodiment of the present invention.

FIG. 6 is a flow diagram illustrating link configuration processing according to one embodiment of the present invention. According to this embodiment, a given port 110 of the crossbar 100 is generally in one of two states, an out of sync state in which the port 110 waits for a predetermined symbol sequence from the connected packet forwarding device 105, and a normal operational mode in which the port 110 may forward data to an attached packet forwarding device 105. At step 610, the crossbar 100 begins transmitting from each port 110 a predetermined sequence of symbols referred to as the configuration sequence. The configuration sequence causes attached packet forwarding devices 105 to respond with a predetermined sequence of symbols, for example. At step 620, the crossbar 100 monitors its ports 110 for receive activity responsive to the configuration sequence. If the expected response (e.g., a predetermined sequence of symbols from a packet forwarding device 105 that recognizes the message exchange protocol) is not received on a given port 110, then the crossbar 100 ignores other receive activity (step 630) and continues to transmit the configuration sequence and monitor the link. When the expected response is received successfully by the crossbar 100, port processing continues with step 640. At step 640, the port 110 transitions to the normal operational mode and may begin forwarding data by performing the handshaking described below, for example. While in normal operational mode, however, the port 110 continues to monitor link activity at step 650. If a predetermined threshold of unrecognized symbols are received on the link (step 660), the port 110 may fall back to the out of sync state (step 670). After transitioning to the out of sync state, at step 670, the port 110 may re-start the configuration sequence at step 610. In this manner, the crossbar 100 may automatically detect the presence of an attached packet forwarding device 105 that recognizes the message exchange protocol.

Crossbar-Packet Forwarding Device Handshaking

Figure 7:
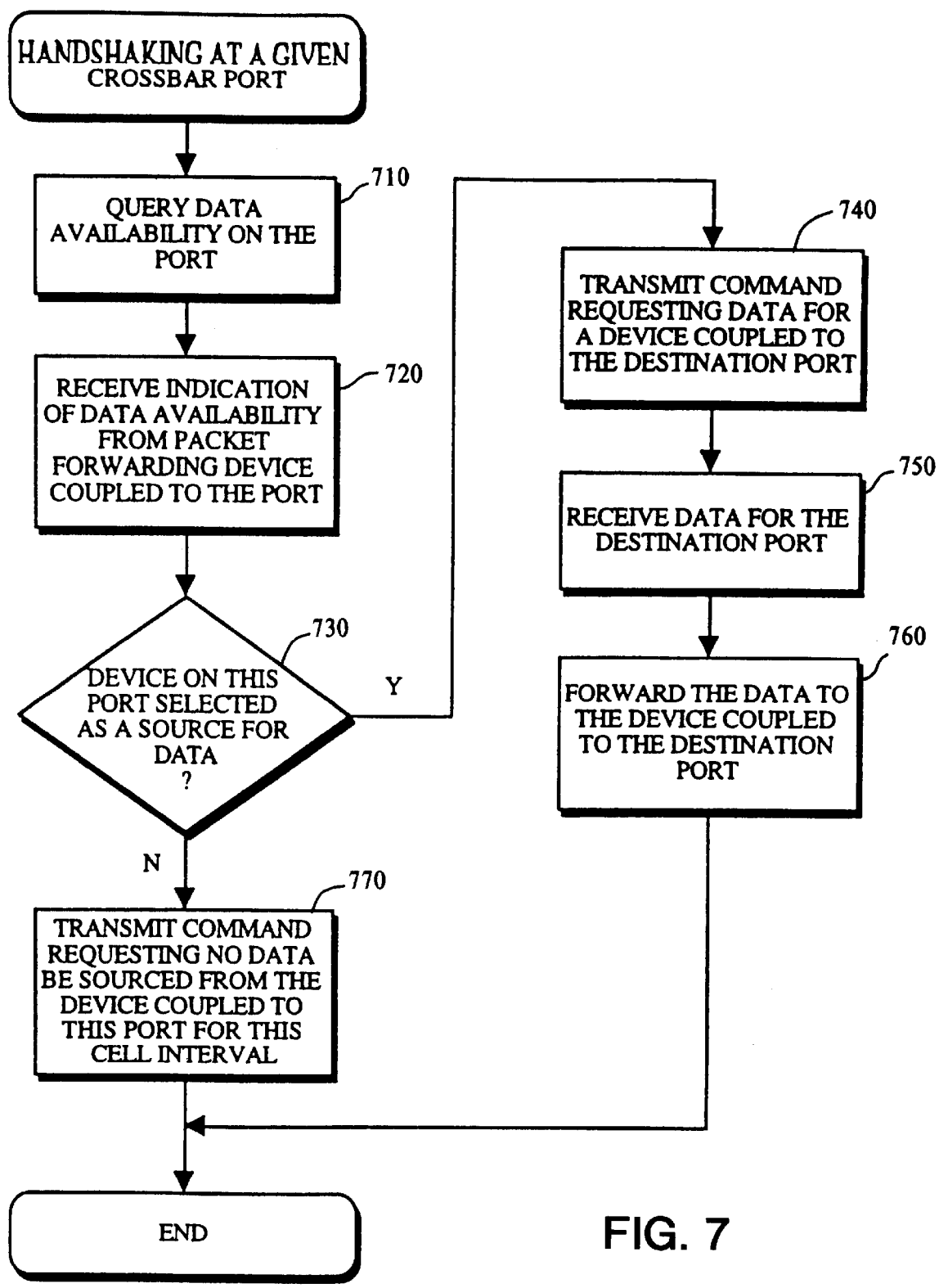
FIG. 7 is a flow diagram illustrating handshaking processing from the perspective of the interconnect device according to one embodiment of the present invention.

FIG. 7 is a flow diagram illustrating handshaking processing from the perspective of the crossbar 100 according to one embodiment of the present invention. The steps described below represent exemplary handshaking that may be performed for each port 110 of the crossbar 100. The steps may be performed under the control of a programmed processor, such as processor 201, or the logic may be implemented and distributed among hardware within the receive processor 235 and the transmit processor 250, for example.

At step 710, the crossbar 100 queries the packet forwarding device 105 connected to the port 110. The query is intended to solicit information regarding the type of data awaiting transmission at the packet forwarding device 105. According to one embodiment, the types of data may include data destined for a particular port 110 of the crossbar 100. The query may be in the form of cells 340, 350 or 360 described above, for example.

At step 720, the crossbar 100 receives an indication of data availability from the packet forwarding device 105. According to one embodiment, the indication of data availability may be in the form of a menu contained within a message, such as cell 370, 380, or 390.

At step 730, a determination is made as to whether the packet forwarding device 105 connected to this port 110 will serve as the source for data forwarded through the crossbar 100 for the current cell interval. Arbitration processing that may be employed to make the determination of step 730 will be described below. In any event, if data will be sourced from the packet forwarding device 105 connected to this port 110, then processing continues with step 740; otherwise, processing continues with step 770. At step 740, the crossbar 100 transmits a command to the packet forwarding device 105 requesting data for the device 105 coupled to the destination port 110. The command may be in the form of the command field 460 within the header 305 of a cell 320 such as cell 340, 350, or 360.

At step 750, the crossbar 100 receives the data requested for the destination port, and the data is forwarded to the packet forwarding device 105 coupled to the destination port at step 760.

At step 770, it has been determined previously at step 730 that the packet forwarding device 105 coupled to this port will not serve as a source for data for the current cell interval. In this case, the crossbar 100 transmits a command indicating to the packet forwarding device 105 that no data is required during this cell interval.

The handshaking process above may be continued while the link between the packet forwarding device 105 and the crossbar 100 remains configured by repeating the query and command message exchange starting at step 710.

Path Arbitration

For an N-port crossbar 100, each cell interval, any of up to N packet forwarding devices 105 coupled to the crossbar 100 may have data for any of the other N-I packet forwarding devices 105 or data to be looped back to the same packet forwarding device 105. A path comprises a source link from the source packet forwarding device 105 (i.e., the packet forwarding device from which data will be forwarded) to the crossbar 100 and a destination link from the crossbar 100 to the destination packet forwarding device 105 (i.e., the packet forwarding device to which data will be forwarded). Thus, N×N possible paths (e.g., source-destination combinations) exist through the crossbar 100. However, because a source or destination link may be used for only one path at a time, a maximum of N paths may forward data during a given cell interval. Thus, when one or more packet forwarding devices 105 want to use the same link of a path, an arbitration mechanism may be employed to fairly and efficiently choose which of the N×N paths to select for a given cell interval (also referred to as an arbitration interval). According to one embodiment of the present invention, the arbitration mechanism seeks to achieve fairness on two different levels while maximizing the utilization of the crossbar 100 and maximizing the utilization of each link. The two levels of fairness include a first level of fairness and a second level of fairness. The first level of fairness gives each path through the crossbar 100 at least one opportunity to forward data out of every N cell intervals. The second level of fairness distributes excess bandwidth (i.e., that bandwidth resulting from a path not being utilized during its opportunity) among other paths that may have cells available.

An exemplary 8×8 menu matrix 800 upon which the arbitration mechanism of the present invention may operate will now be described with reference to FIG. 8. While an 8×8 menu matrix is used for purposes of providing examples of how the arbitration mechanism functions according to embodiments of the present invention, it is appreciated that the method is extendable to crossbars 100 having more or less ports. According to one embodiment, packet forwarding devices 105 provide the crossbar 100 with menus, in the form of bit-masks, for example, identifying crossbar ports to which they have data to transmit. The 64 possible paths through an 8 port crossbar may be represented by menu matrix 800 with source ports represented by rows and destination ports represented by columns. In this example, the menus for a particular cell interval may be collected into the menu matrix 800 by writing a menu received at port X into row X of the menu matrix 800.

One arbitration scheme of the present invention searches 8 "diagonals" (810, 820, 830, 840, 850, 860, 870, and 880) of the menu matrix 800. All of the diagonals except the first wrap-around to the top of a column in the matrix upon arriving at the bottom of the previous column in the matrix. For purposes of identifying a particular diagonal, a diagonal will be identified as diagonal #R where R is the row in which the diagonal begins when traversing it from left to right. Therefore, diagonal 810 corresponds to diagonal #7, diagonals 820a and 820b together correspond to diagonal #6, diagonals 830a and 830b together correspond to diagonal #5, diagonals 840a and 840b together correspond to diagonal #4, diagonals 850a and 850b together correspond to diagonal #3, diagonals 860a and 860b together correspond to diagonal #2, diagonals 870a and 870b together correspond to diagonal #1, and diagonals 880a and 880b together correspond to diagonal #0. Each of the 8 diagonals includes 8 of the 64 possible paths through the 8 port crossbar of this example.

Figure 8:
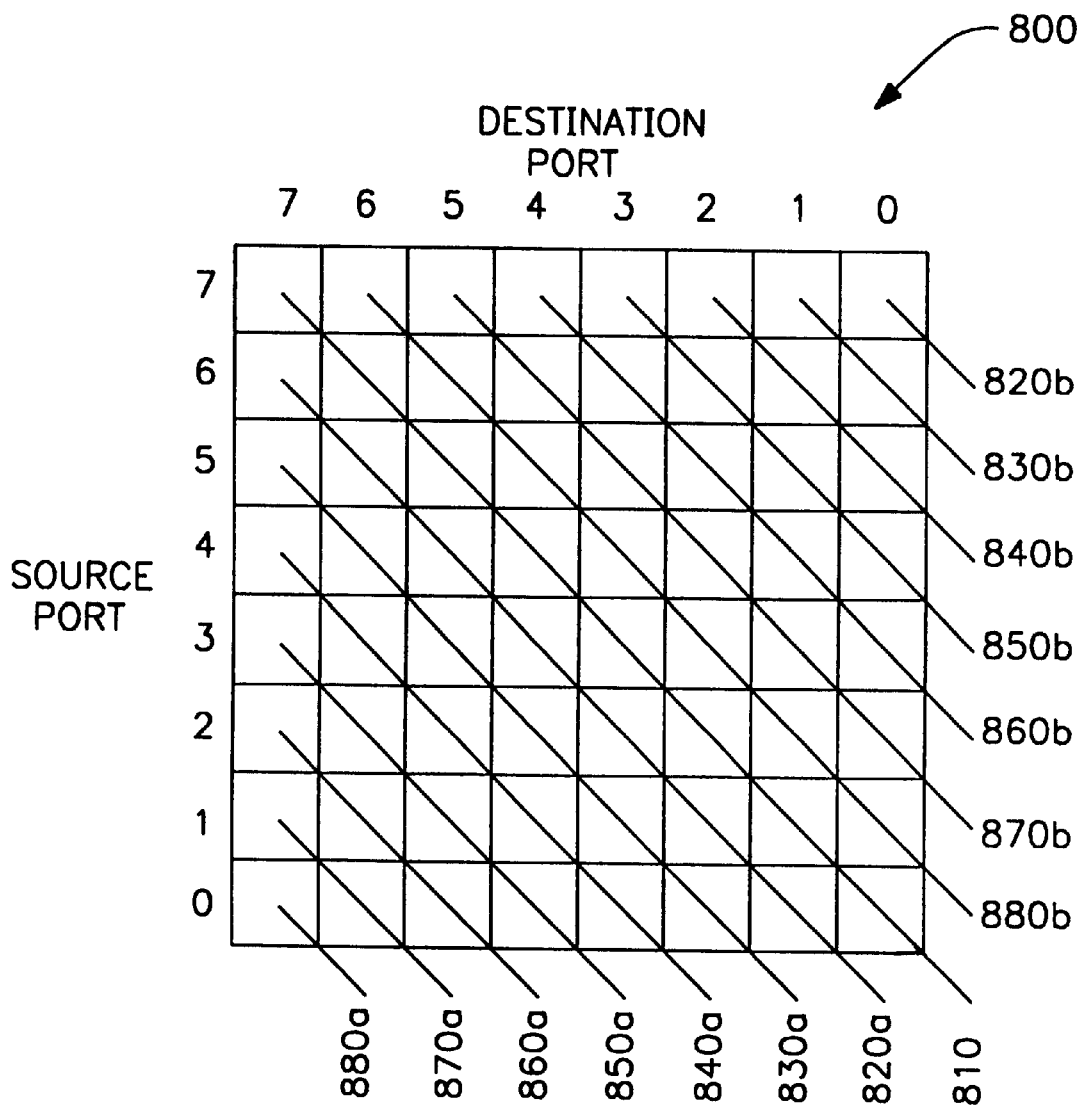
FIG. 8 illustrates a menu matrix which may be employed to facilitate arbitration processing according to one embodiment of the present invention.
Figure 9:
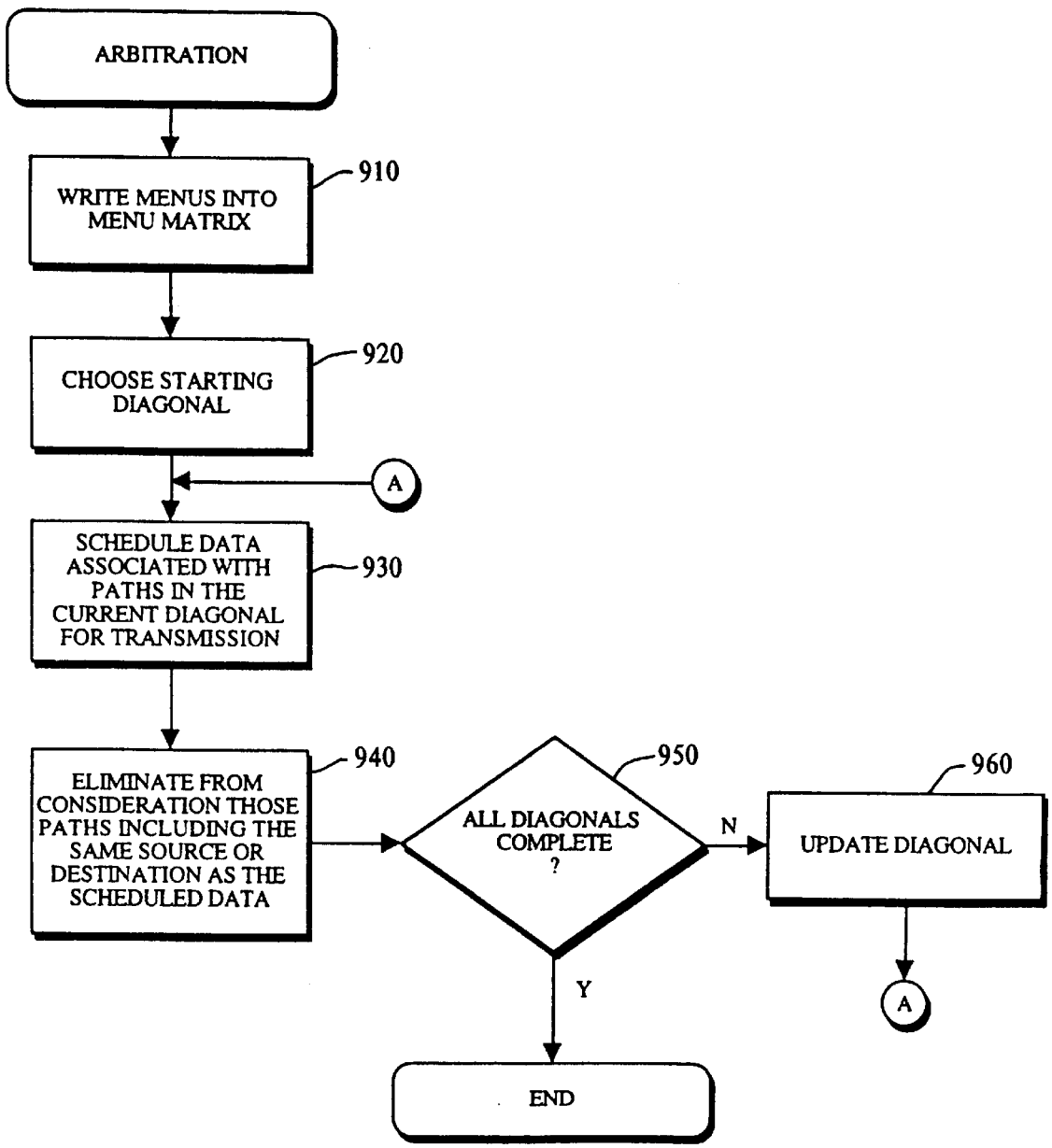
FIG. 9 is a flow diagram illustrating arbitration processing according to one embodiment of the present invention.

An important characteristic of the menu matrix diagonals as depicted in FIG. 8 is the fact that paths on the same diagonal do not require a common source or destination link. A diagonal search arbitration method will now be described with reference to FIG. 9. At step 910, menus received at each port for a particular cell interval are collected in a menu matrix. At step 920, a starting diagonal is chosen. At step 930, data associated with the paths along the current diagonal is scheduled for transmission. According to one embodiment, scheduling data for a particular path involves selecting to receive the data destined for the destination packet forwarding device from the source packet forwarding device. For example, an appropriate command (e.g., an order) may be generated and transmitted to the source packet forwarding device.

At step 940, those paths that include the same source or same destination as the data scheduled in step 930 are eliminated from further consideration. For example, if in step 930 data was scheduled to be forwarded from port #1 to port #2, then port #1 would be eliminated from further consideration as a source for further data during the particular cell interval. Since, port #2 is already allocated for this cell interval, port #2 would similarly be removed from further consideration as a destination. Assuming a menu matrix based implementation, this elimination step involves eliminating rows corresponding to sources of selected paths and columns corresponding to destinations of selected paths as illustrated in FIGS. 10B and 10C. At step 950, it is determined whether all diagonals of the menu matrix have been processed. If so, the arbitration for the current cell interval is complete. If not, the current diagonal is updated at step 960 and processing continues with step 930. Several approaches for determining the order in which diagonals are processed are described below.

Exemplary Diagonal Selection Approaches

To achieve the fairness criteria discussed above it is preferable that the diagonals not always be searched in the same sequence. One approach, referred to as the "round robin" approach searches sequentially through the diagonals within a given arbitration interval, but the starting diagonal (e.g., the first one searched in an interval) is determined by a round robin scheme.

A second diagonal selection approach referred to as the "least recently used diagonal" approach involves maintaining an N-deep list of diagonals. During the arbitration interval, the diagonals are searched in the order in which they appear in the list. During each arbitration interval, the first diagonal containing a cell is moved to the end of the list.

A third approach involves round robin selection of the starting diagonal and a random selection for each subsequent diagonal during an arbitration interval.

Another approach involves the arbitration process accessing a memory containing therein a predetermined set of N search sequences of N diagonals per sequence. A round robin selection may be performed to choose the next sequence of the set of N search sequences. The N×N diagonal search sequence table may be reprogrammable if the table is stored in non-volatile RAM rather than ROM.

Figure 10A:
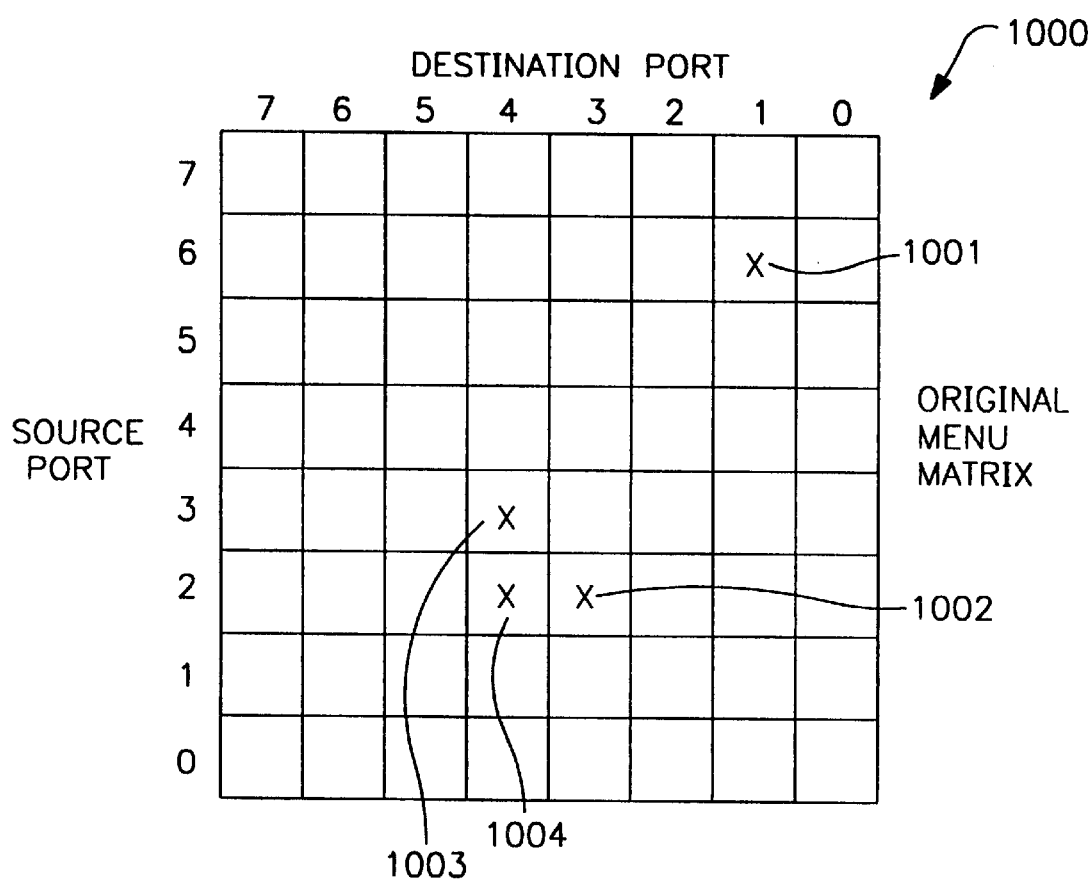
FIGS. 10A, 10B, and 10C illustrate exemplary path selections for a set of menus according to one embodiment of the present invention.
Figure 10B:
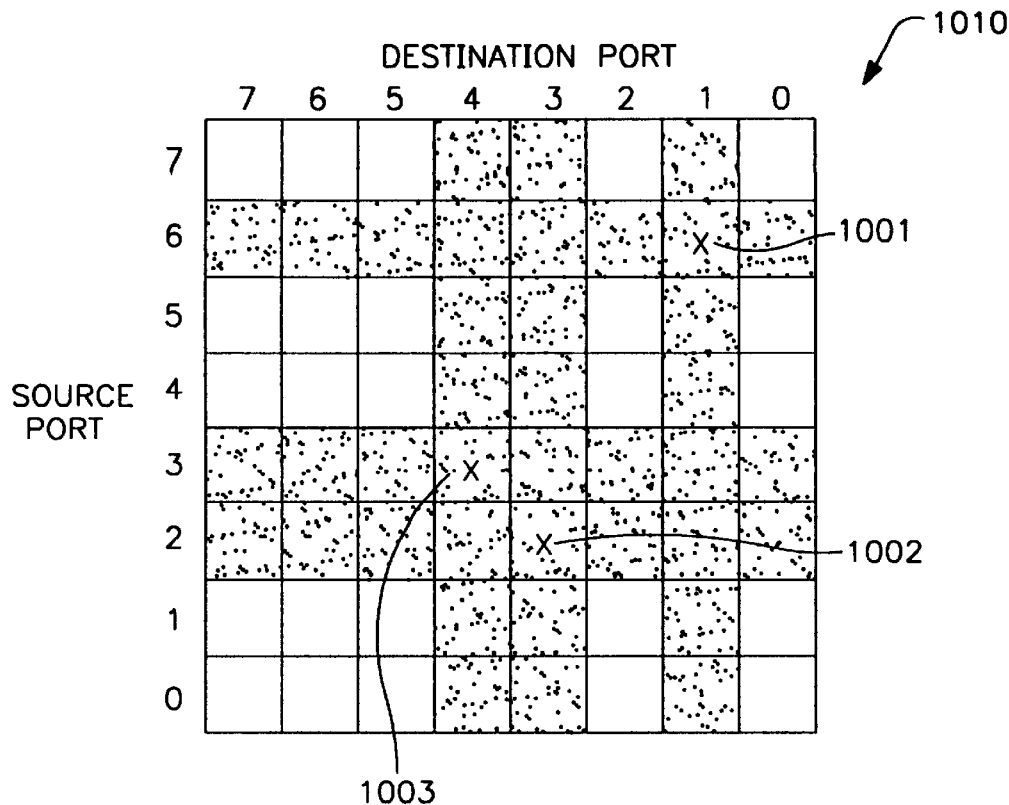
Figure 10C:
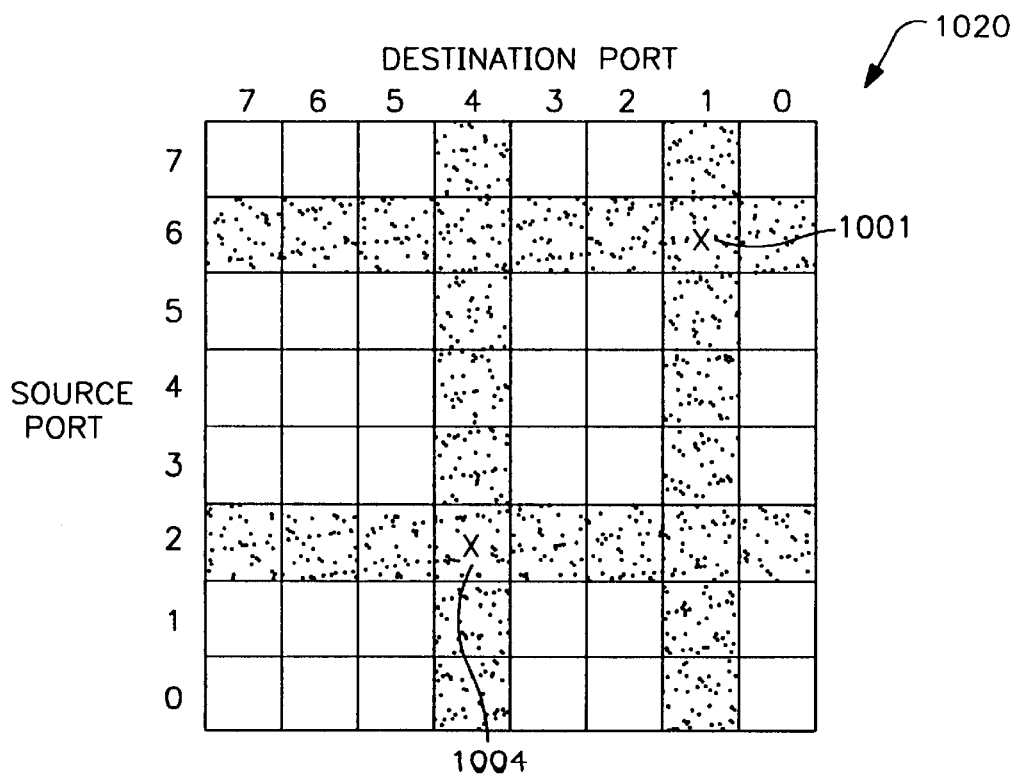

Having described several menu matrix arbitration mechanisms, an example with reference to FIGS. 10A, 10B, and 10C is now provided. FIG. 10A illustrates an 8×8 menu matrix 1000 in which three packet forwarding devices 105 have data available for transmission through the crossbar 100. The packet forwarding device 105 attached to port 6 has data destined for port 1, the packet forwarding device 105 attached to port 3 has data destined for port 4, and the packet forwarding device 105 attached to port 2 has data destined for both ports 4 and 3.

FIG. 10B illustrates one possible configuration of the crossbar for a cell interval based upon the original menu matrix 1000 of FIG. 10A. The selected paths are circled and rows and columns that have been eliminated as a result of such selections are blackened. This configuration has selected path 1001, path 1002, and path 1003. Path 1001 allows the data available at the packet forwarding device attached to port 6 to be forwarded to the packet forwarding device attached to port 1. Path 1002 allows the data available at the packet forwarding device attached to port 2 to be forwarded to the packet forwarding device attached to port 3. Path 1003 allows the data available at the packet forwarding device attached to port 3 to be forwarded to the packet forwarding device attached to port 4. The configuration illustrated by menu matrix 1010 assumes the arbitration mechanism favorably evaluated either path 1003 or 1002 over path 1004 and eliminated from consideration the source or destination port associated with path 1004.

FIG. 10C illustrates another possible configuration of the crossbar for a cell interval based upon the original menu matrix 1000 of FIG. 10A. This configuration has selected path 1001 and path 1004. Again, path 1001 allows the data at port 6 to be forwarded to port 1. Path 1004 allows the data at port 2 to be forwarded to port 4. The configuration illustrated by menu matrix 1020 assumes the arbitration mechanism favorably evaluated path 1004 over both paths 1002 and 1003 and eliminated the source associated with path 1002 from consideration and the destination associated with path 1003.

Given the original menu matrix 1000, preferably, the arbitration mechanism employed selects path 1001 8 out of 8 cell intervals and each of path 1002, path 1003, and path 1004 4 out of 8 cell intervals, which represents the best case behavior for this original menu matrix 1000. In this manner, the crossbar 100 forwards 8 cells of data over 8 cell intervals through path 1001 and 4 cells of data over 8 cell intervals through each of path 1002, path 1003, and path 1004.

Alternative Embodiments

Many alternative embodiments are contemplated by the inventors of the present invention. For example, path arbitration in the crossbar 100 is not limited to searching diagonals. In one embodiment, a least recently used path may be selected. For instance, a list of all N×N paths may be maintained. In each arbitration interval, the list of paths may be traversed. As each path appears in the list, if can be determined whether or not a cell is available for the path and if either the source link or destination link are already committed for this interval. As paths are used, they are placed at the end of the list.

Two other alternatives that may be employed for path arbitration include a snapshot arbitration similar to a common approach to performing fair bus arbitration, and an exhaustive search approach. The exhaustive search involves keeping a history of when each path through the crossbar 100 was last used. Then, during each arbitration interval, every possible configuration of the crossbar 100 is considered and assigned a score based on a weighting representing how long it has been since a cell crossed the selected paths and how many cells would be transferred during the cell interval for the particular configuration. The paths associated with the configuration having the highest score may then be scheduled.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A virtual chassis system comprising:

a bus;

a plurality of ports coupled to the bus; and a transmit command generator coupled to the bus, the transmit command generator includes arbitration logic configured to: (1) select one or more paths through the virtual chassis system upon which data is to be forwarded for a particular time interval, wherein one or more menu messages indicating the availability of data for one or more of the plurality of ports are received on one or more of the plurality of ports, the one or more paths are selected based upon one or more received menu messages, each of the one or more paths include a source port and a destination port; and (2) request data for the one or more paths, wherein data for each of the one or more paths is requested by transmitting an order message from each source port, the order message selecting data corresponding to the destination port of the path;

wherein data is received at the source port of each selected path and the data is forwarded to the destination port of the corresponding path concurrently with data being forwarded over other of the selected paths during the particular time interval.

2. The virtual chassis system of claim 1, wherein the bus is implemented as a plurality of point-to-point buses.

3. A method performed by an interconnect device for communicating data between a source port and a destination port of the interconnect device, the method comprising the steps of:

the interconnect device receiving a menu message on the source port, the menu message indicating one or more types of data that are awaiting to be received on the source port;

the interconnect device transmitting an order message from the source port based upon the menu message, the order message selecting a type of data of the one or more types of data for receipt on the source port;

the interconnect device receiving a message containing data of the type selected by the order message on the source port;

the interconnect device forwarding the data received on the source port to the destination data port, wherein the destination port is determined based on the selected data type; and the interconnect device transmitting the data from the destination port.

4. The method of claim 3, further including the step of transmitting a first message from the interconnect device, the first message requesting information regarding the one or more types of data awaiting receipt on the source port.

5. The method of claim 3, further including the step of establishing a link between a first packet forwarding device and the interconnect device and between a second packet forwarding device and the interconnect device.

6. The method of claim 3, wherein the interconnect device includes a plurality of ports, wherein the one or more types of data are characterized by the port of the plurality of ports to which the data is destined.

7. The method of claim 6, further comprising the step of selecting a configuration of the interconnect device, the configuration defining a set of paths representing a subset of a total possible set of paths through the interconnect device, each path of the set of paths including a source port and a destination port.

8. The method of claim 7, wherein the step of selecting a configuration of the interconnect device further includes allocating bandwidth through the interconnect device and avoiding port conflicts by employing an arbitration scheme, the arbitration scheme providing opportunities for each port of the plurality of ports to forward data at a predetermined rate and assuring no port of the plurality of ports is included in more than one path of the set of paths as a source or destination during a given arbitration interval.

9. The method of claim 8, further comprising the step of evaluating diagonals of a matrix in which a first dimension corresponds to source ports and a second dimension corresponds to destination ports, each source-destination pair defining a location of the matrix, each location providing an indication regarding the availability of data at a packet forwarding device coupled to the source port for the corresponding destination port.

10. The method of claim 9, further comprising the step of accessing a predetermined set of search sequences to determine the order in which the diagonals are evaluated.

11. The method of claim 9, further comprising the steps of selecting a starting diagonal in a round robin fashion, and selecting subsequent diagonals sequentially based upon the starting diagonal, wherein the steps of selecting the starting diagonal and selecting the subsequent diagonals are performed during each arbitration interval.

12. The method of claim 8, further comprising the step of the arbitration scheme selecting one or more least recently used paths for inclusion in the set of paths.

13. A method performed by an interconnect device for forwarding data received on one or more source ports to one or more destination ports of the interconnect device, the method comprising the steps of:

the interconnect device receiving on at least one source port an indication of a set of destination addresses for which data received on the respective source port is destined;

the interconnect device selecting a configuration of the interconnect device based upon the received at least one indication of destination addresses, the configuration representing a set of non-conflicting paths through the interconnect device, each of the non-conflicting paths including one source port and at least one destination port; and the interconnect device forwarding data received on the source ports to corresponding destination ports identified by the paths of the selected configuration.

14. The method of claim 13, wherein the destination addresses correspond to port addresses of the interconnect device.

15. The method of claim 13, wherein the destination addresses correspond to addresses of devices attached to the ports of the interconnect device.

16. The method of claim 13, wherein the received indication on the at least one source port is in the form of a menu message.

17. The method of claim 13, further comprising the step of the interconnect device transmitting a signal to at least one of the source ports indicating the destination port for the corresponding identified path for the source port in the selected configuration.

18. The method of claim 17, wherein the transmitted signal indicating the destination port is in the form of an order message.

19. An apparatus for interconnecting a plurality of packet forwarding devices comprising:

a command generator configured to transmit order messages to attached packet forwarding devices based upon menu messages received during a predetermined time interval, each menu message indicating one or more types of data that are available for transmission at a packet forwarding device originating the menu message, the order messages selecting data from the attached packet forwarding devices for transmission; and a plurality of ports coupled to the command generator, the plurality of ports configured to provide the menu messages received from the attached packet forwarding devices to the command generator for processing, each of the plurality of ports further configured to forward data from a source port identified by the command generator to the attached packet forwarding device.

20. An apparatus for interconnecting a plurality of packet forwarding devices comprising:

a bus;

a plurality of ports coupled to the bus;

a transmit command generator coupled to the bus, the transmit command generator includes arbitration logic configured to select one or more paths through the apparatus upon which data is to be forwarded for a particular time interval, and to request data for the one or more paths, wherein one or more menu messages are received indicating the availability of data for one or more of the plurality of ports, the one or more paths are selected based upon the received one or more menu messages, each of the one or more paths include a source port and a destination port, data for each of the one or more paths is requested by transmitting an order message, the order message selecting data corresponding to the destination port of the path, and after the data for a path is received at the source port, the data is forwarded to the destination port of the path during the particular time interval.

21. The apparatus of claim 20, wherein the bus comprises a plurality of point-to-point buses.

22. An apparatus for interconnecting a plurality of packet forwarding devices comprising:

a storage device having stored therein a path management routine for selecting one or more paths upon which data is to be forwarded through the apparatus for a particular time interval; and a processor coupled to the storage device for executing the path management routine to select the one or more paths, and to request data for the one or more paths, wherein one or more menu messages indicating the availability of data for one or more of the plurality of ports are received, the one or more paths are selected based upon the one or more menu messages, each of the one or more paths include a source port and a destination port, data for each of the one or more paths is requested by transmitting an order message from each source port, the order message selecting data corresponding to the destination port of the path, and after the data for a path is received at the source port, the data is forwarded to the destination port of the path during the particular time interval.

23. The apparatus of claim 22, wherein the one or more paths upon which data is to be forwarded are chosen such that no port of the plurality of ports is the source port for more than one path, nor the destination port for more than one path.

24. A method for operating an interconnect device, the method comprising the steps of:

the interconnect device receiving a first indication of a first set of destination ports on a first port, the first set of destination ports including a second port;

the interconnect device receiving a second indication of a second set of destination ports on a third port, the second set of destination ports including a fourth port;

the interconnect device selecting a configuration of the interconnect device based upon the received first and second indications, the configuration representing a set of non-conflicting destination ports; and the interconnect device concurrently forwarding data received on the first port to the second port and forwarding data received on the third port to the fourth port.

25. The method of claim 24, wherein the first set of destination ports further includes at least one more of a group comprising the third and the fourth ports.

26. The method of claim 25, further comprising the step of the interconnect device indicating on the first port for a device connected to the first port to transmit data destined for the second port.

27. The method of claim 25, wherein the second set of destination ports further includes at least one more of a group comprising the first and the second ports.

28. The method of claim 25, wherein a first data path between the first and second ports does not conflict with a second data path between the third and fourth ports.

29. The method of claim 24, further comprising the step of the interconnect device indicating on the first port for a device connected to the first port to transmit data destined for the second port.

30. The method of claim 29, further comprising the step of the interconnect device indicating on the third port for a device connected to the third port to transmit data destined for the fourth port.

31. The method of claim 29, wherein the indication on the first port is in the form of an order message.

32. The method of claim 24, wherein the received indications on the interconnect device of menu messages.

* * * * *